MAGAZINE LOADING MAGNETIC TAPE RECORDER-REPRODUCERS

Filed April 10, 1956 5 Sheets-Sheet 1

INVENTORS
ALEXANDER KREITHEN
ROBERT W. BRAGG

BY Chas. K. Davies Jr
ATTORNEY

INVENTORS
ALEXANDER KREITHEN
ROBERT W. BRAGG

BY Chas. K. Davis Jr.
ATTORNEY

March 5, 1963 A. KREITHEN ETAL 3,080,101

MAGAZINE LOADING MAGNETIC TAPE RECORDER-REPRODUCERS

Filed April 10, 1956 5 Sheets-Sheet 3

INVENTORS
ALEXANDER KREITHEN
ROBERT W. BRAGG

BY Chas. K. Davis Jr.

ATTORNEY

MAGAZINE LOADING MAGNETIC TAPE RECORDER-REPRODUCERS

Filed April 10, 1956 5 Sheets-Sheet 4

INVENTORS
ALEXANDER KREITHEN
ROBERT W. BRAGG

BY Chas. K. Davies Jr.
ATTORNEY

MAGAZINE LOADING MAGNETIC TAPE RECORDER-REPRODUCERS

Filed April 10, 1956 5 Sheets-Sheet 5

INVENTORS
Alexander Kreithen
Robert W. Bragg
BY Watson, Cole, Grindle & Watson
ATTORNEYS

1

3,080,101
MAGAZINE LOADING MAGNETIC TAPE RECORDER-REPRODUCERS

Alexander Kreithen, Silver Spring, and Robert W. Bragg, Rockville, Md., assignors, by mesne assignments, to The Ohio Citizens Trust Company, trustee, Toledo, Ohio, a corporation of Ohio Filed Apr. 10, 1956, Ser. No. 577,234
2 Claims. (Cl. 226—174)

Our present invention relates to an improved magazine-loading magnetic tape recorder-reproducer of the type designed to employ a single reel tape-loaded magazine.

The device of our invention is simple in construction and operation, requiring only a single action of inserting the magazine into the reproducer and an additional single action of locking the magazine in position for reproduction and at the same time setting the control mechanism for the operation of the playing device.

Previous types of tape recorders and reproducers have not had full exploration because they have required the user to thread the tape through a complex arrangement of slots, pulleys and mechanisms, and through various reels paying attention to the threading of the correct end and the correct side, and then after use the tape had to be rewound for further use.

All of the previously used methods and apparatus for the use of tape recording play backs were intricate, involved, and required more patience and knowledge than the average user would have available.

There remains, however, one method which overcomes the disadvantages of the previous types and this one contemplates the use of a single reel magazine in which the tape is fed from the center of the spool and is fed back to the outside of the same spool as a continuous loop. By cutting such a loop and splicing the ends, one of which has been twisted 180 degrees to form a mobius loop, both sides of the tape are made available thus providing a continuous recording surface having twice the length of the original tape. No rewinding is necessary for the reason that obviously when the tape has passed completely by the play back head, the tape is in exactly same position as at the start.

The device of this invention, then, is designed to accommodate such a single reel mechanism. Accordingly it is the principal object of this invention to provide a mechanism which will receive a single reel tape magazine including its case, so that by inserting the magazine into the reproducer, the tape which is normally concealed for protection will be brought into playing position with the play-back head, will be fed by a capstan past the playing head, and will be permitted to return to its concealed position before it is removed.

A further object is to provide a recorder-reproducer in which the magazine occupies essentially space equal to the volume of the recording medium only.

It will be apparent, of course, that while we herein refer to the use of a single reel magazine, the device may well be adapted to receive a multiplicity of magazines if more than one play-back head is provided.

In the accompanying drawings we have illustrated one complete example of the physical embodiment of our invention according to the best mode we have thus far devised but it will be understood that various changes and alterations may be made in the exemplified structure within the spirit and scope of the appended claims.

2

Figure 3:
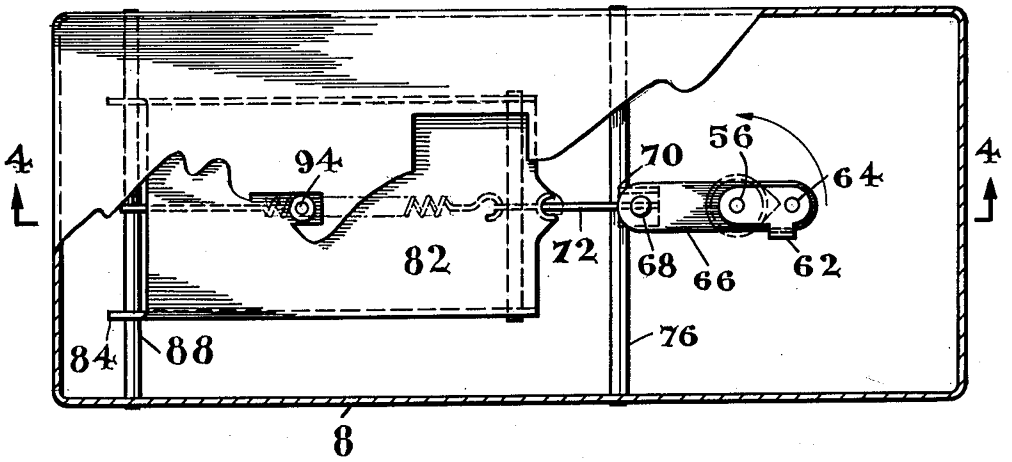

FIGURE 3 is a bottom plan of the base plate of the device showing the mechanism for moving the pressure roller and pressure head into position.

Figure 4:
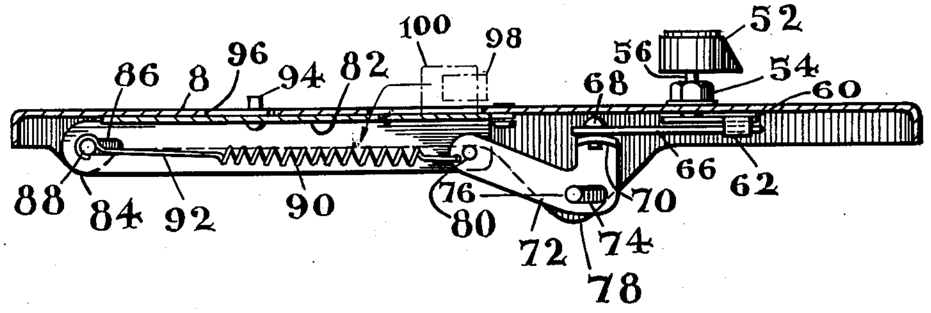

FIGURE 4 is a longitudinal section along line 4—4 of FIG. 3.

Figure 5:
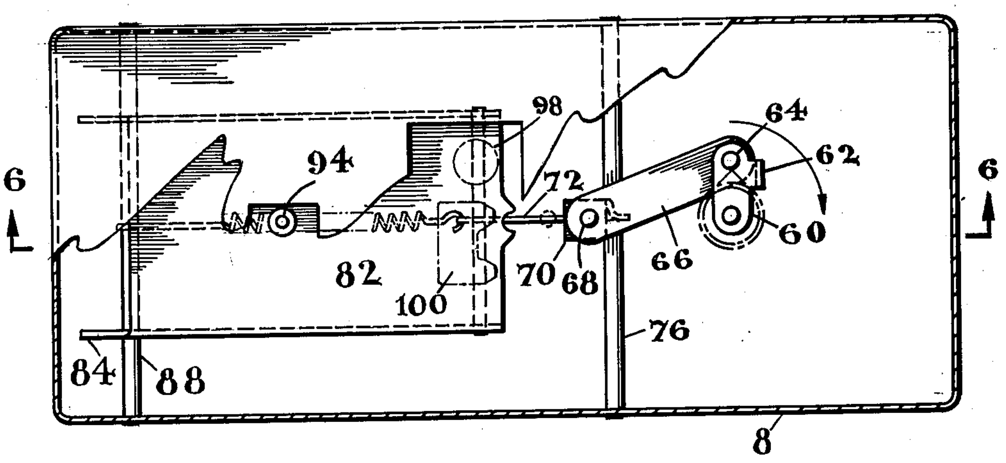

FIGURE 5 is a bottom plan view of the base plate showing the mechanism for moving the platform.

Figure 6:
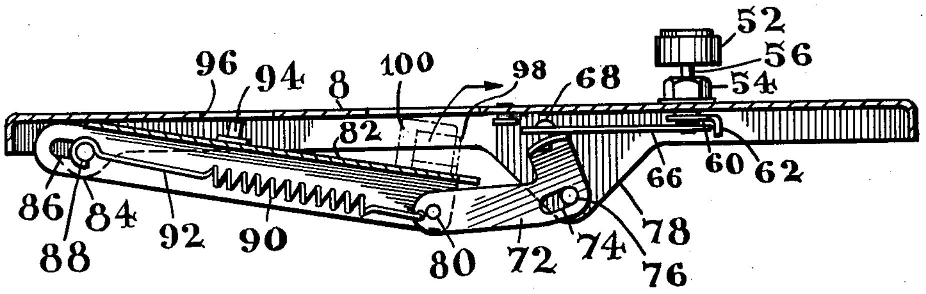

FIGURE 6 is a longitudinal section along line 6—6 of FIG. 5.

Figure 7:
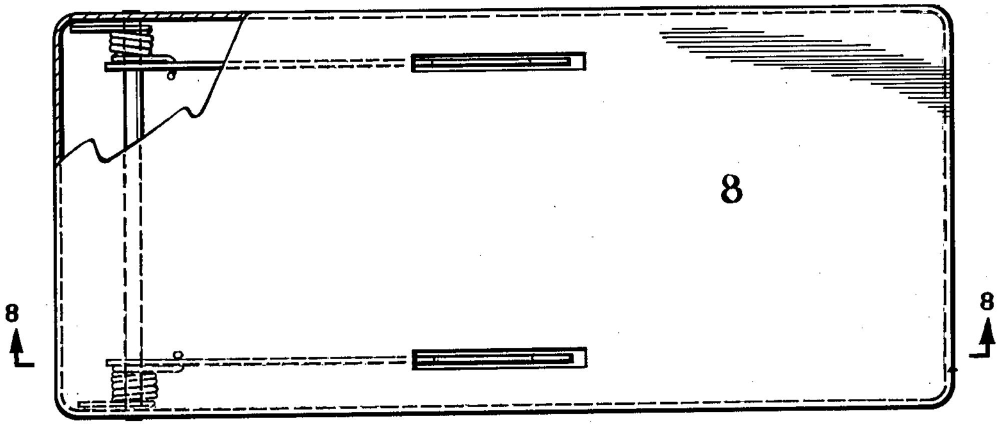

FIGURE 7 is a top plan of the base plate showing the hook members into which the magazine is pressed.

Figures 8, 9:
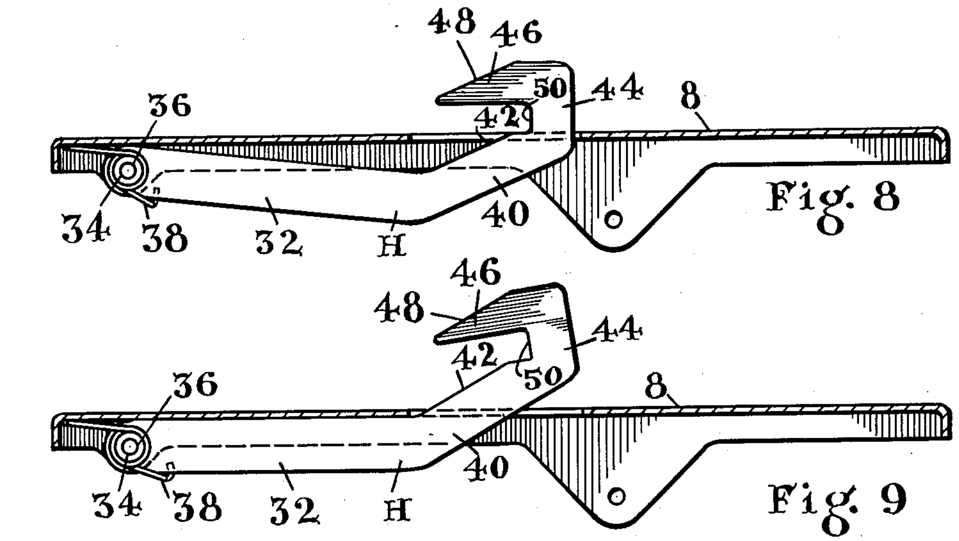

FIGURE 8 is a longitudinal section along line 8—8 of FIG. 7 showing the hook members in depressed position, and FIGURE 9 is a similar view showing the hook members in receiving position.

Figure 10:
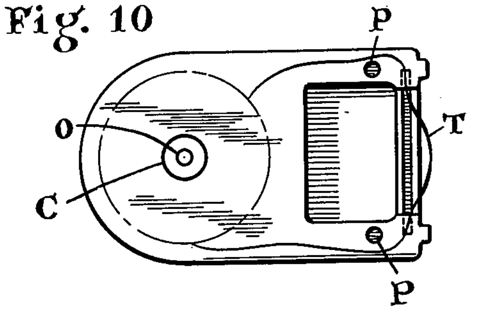

FIGURE 10 is a bottom view of a magazine of the type for which the recorder-reproducer is designed.

Figure 11:
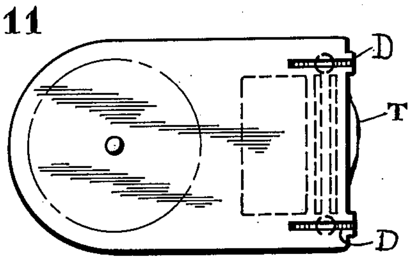

FIGURE 11 is a plan view of the magazine.

Figure 12:
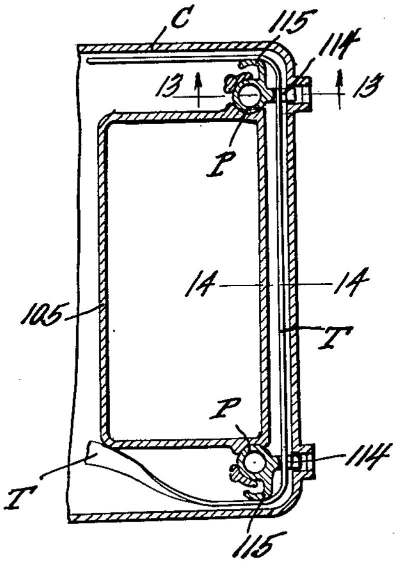

FIGURE 12 is a horizontal sectional view of the forward end of a cartridge of the type shown in FIGURES 10 and 11.

Figure 13:
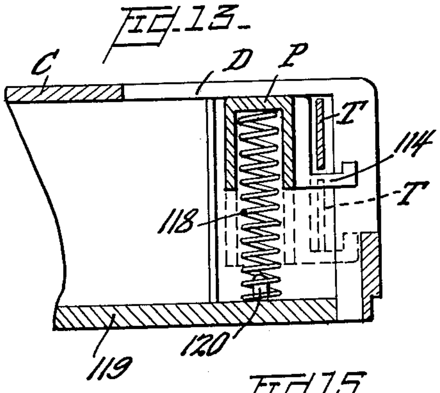
Figure 14:
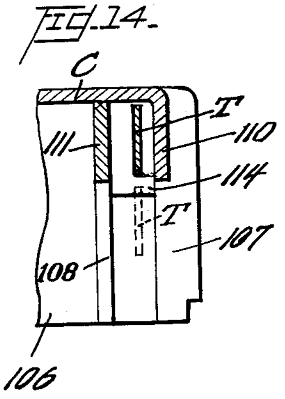

FIGURES 13 and 14 are vertical sections taken on the lines 13 and 14, respectively, of FIGURE 12.

Figure 15:
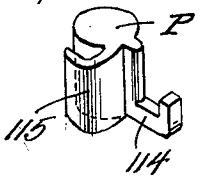

FIGURE 15 is a perspective view of a tape guide constituting an element of the cartridge unit.

Referring now to the drawings in carrying out our invention we employ a carrying case of suitable material and shape, here shown as rectangular having a base portion 2 and a lid 4 detachably secured by hooks 6. A base plate 8 suitably mounted on base 2 supports a motor frame 10 and an electric motor 12 to which current is supplied from a suitable source. Shaft 14 of the motor is provided with a pulley 16 grooved to frictionally engage endless drive belt 18 which in turn drives the large pulley and flywheel 20 on the drive shaft or capstan 22. The capstan 22 is journaled at 24 and 26 in the housing 28 and extends above the base plate 8 in order that the tape to be activated may operably contact the said capstan.

As stated, the herein described invention is best used with the currently available spring loaded plastic cartridge including the tape T of the usual character employed in magnetic recording, and the cartridge or magazine is indicated generally at C. This cartridge is fashioned with a pair of slots D—D in which are operably positioned pins P—P which when depressed move the protected and retracted tape T into position to engage the capstan 22 so that when the capstan is operating the tape will be fed past the hereafter described playing head.

Figure 1:
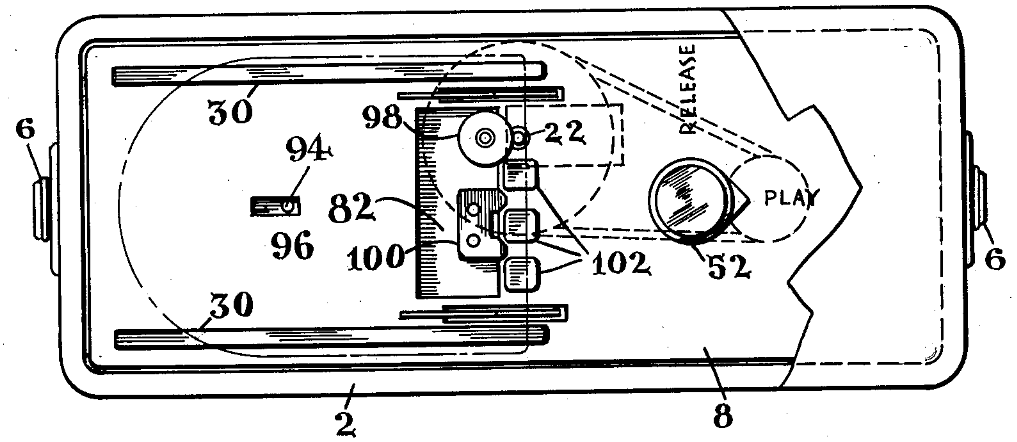
FIGURE 1 is a top plan view of the recorder-reproducer of our invention with the cover removed.
Figure 2:
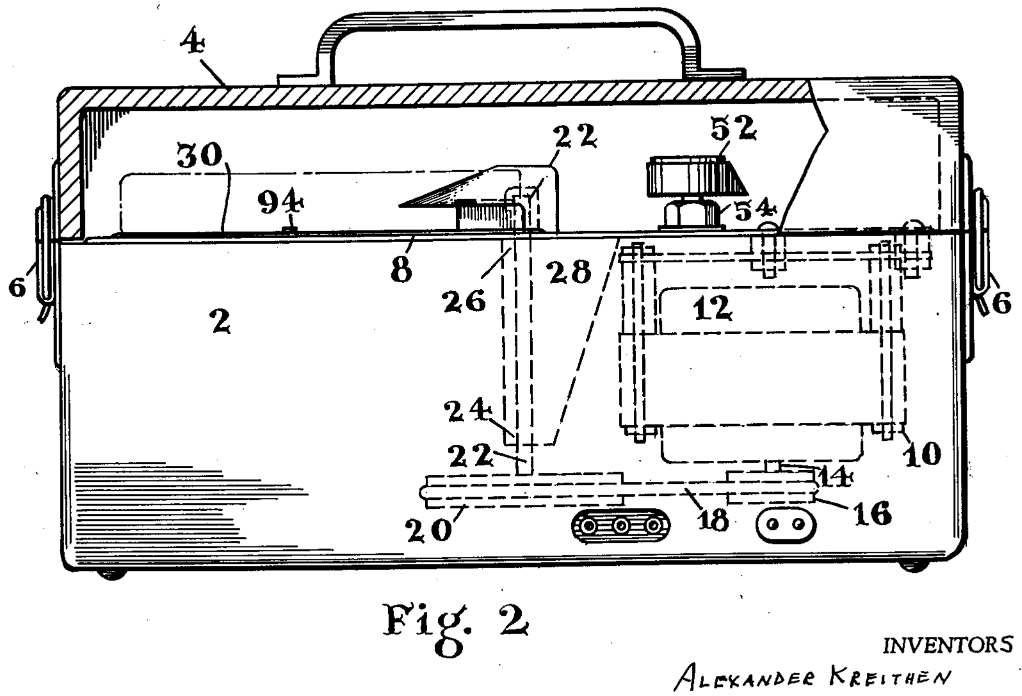
FIGURE 2 is a side elevation of the same partially in section.

The cartridge is adapted to be inserted into the mechanism by gently pushing the same horizontally between the guide plates 30 while the receiving mechanism is as shown in FIG. 2. The slots D—D of the cartridge receive the actuating elements of the receiving mechanism as follows.

A pair of hooks H formed with arms 32 which are journaled as at 34 on the shaft or rod 36 are normally pressed upwardly as shown in FIG. 9. These hooks H have angular arms 40 formed with inclined plane edges 42 and end pieces 44 have prongs 46 formed with inclined plane edges 48; the angular arms 40 and the prongs 46 form a rectangular recess 50 for receiving the cartridge.

Thus as the leading lower edge of the cartridge engages the inclined plane edges 42 of the hooks H and the cartridge being guided horizontally by suitable means on the guides 30 such as a rib, the cartridge will push down the angular arms 40 and the whole of the hooks H against the tension of the springs 38 whereupon the prongs 46 automatically engage the pins P—P in the cartridge and in so doing the pins actuate the cartridge means for lowering the tape contained therein. Hence the tape T is in the single motion of inserting the cartridge or magazine moved from retracted position into playing position.

The conventional type of cartridge described generally hereinbefore is shown in more detail in FIGURES 12 to 15, inclusive. Thus, referring to FIGURE 12, which is a horizontal sectional view taken just below the upper surface of cartridge C, the forward end of the cartridge is provided with a substantially rectangular chamber 105, open at its lower side, as shown at 106. The forward wall of the cartridge and the forward wall of the chamber are partially removed, as shown in FIGURE 14, to provide aligned openings 107 and 108 through which the tape T is exposed when depressed to render the same operative in the manner outlined hereinbefore, the tape T being shown in dotted lines in its operative position and in full lines in its inoperative position in FIGURES 13 and 14. When in its raised inoperative position, the tape is shielded at its forward side by the remainder of the forward wall of the cartridge 110 and at its rearward side by the forward wall 111 of the chamber 105.

The tape T extends from the conventional reel, not shown, outside of the chamber 105 and across the forward end of the cartridge, passing over depressible guide means at either side of the chamber. Such guide means comprises a hollow pin P having at one side a forwardly projecting L-shaped arm 114 and at its outer side a curved flange 115, the tape passing around the curved guide 115 and over the arm 114. Each pin P is supported on a coiled spring 118, received at its upper end within the pin and resting at its lower end on the bottom wall 119 of the cartridge, being centered at its lower end by a stud 120 projecting upwardly from the bottom wall.

It will be appreciated that when the pins P are engaged and depressed by engagement of the prongs 46 with the pins P as hereinbefore described, during the movement of the cartridge into playing position, the pins P and the arms 114 thereon are lowered against the action of springs 118, so that the section of the tape T which extends across the forward end of the cartridge C is depressed to the operative playing position in which it is fully exposed at both faces. The mechanism which will now be described is then actuated to press the tape against the driving capstan 22 and against the usual electronic recording devices or playing heads to initiate and continue the recording step.

Referring now to FIGS. 1 through 6, we employ a single control knob 52 which activates all motions and actions necessary to play after the cartridge has been inserted as described.

The knob is secured on the vertical shaft 56, which is secured by lock nut 54, extending through the base plate 8 and may be rotated 90 degrees. When the knob is turned from non-playing position as seen in FIG. 6, the shaft also rotates and carries with it lever 60 which has a stop lip 62, and lever 60 is secured by rivet 64 to link 66. This link is loosely attached by pin 68 to rocker plate 70 of the bellcrank 72 formed with an elongated journal opening 74 for pin 76 attached to and extending laterally from the ears 78 of base plate 8.

The other arm of bell crank 72 is secured by pin 80 to pressure platform 82 formed with ears 84 having journal slots 86 for rod 88. A spring 90 and hooks 92 urge the platform to retracted position as shown in FIG. 6.

From the above description it will be apparent that rotation of the knob 52 is transferred to lever 60 and will cause link 66 to execute a linear motion along the longitudinal axis of the machine. This motion also causes bellcrank 72 to move along the same axis and at the same time to slide and rotate on bearing pin 76. The movement of the bellcrank then causes the pressure platform 82 to move from its normally retracted position along the same axis and at the end of its linear travel to rotate into a final position flush with base plate 8 and immediately beneath the opening 105 in the base plate 8 and the registering opening 106 in the bottom wall 119 of the cartridge C. The final portion of the movement of the platform is again along its longitudinal axis by virtue of slots 86 supported on rod 88 and in this last phase with the pin 94 engaged with the cartridge C, the same is locked into position with the pressure roller 98 and pressure head 100 pressing the tape against the playing elements.

The said pin 94 on the platform is aligned to extend through opening 96 of the base plate 8 when the platform is raised so that the pin 94 may engage an opening O in the cartridge C. The pressure platform carries roller 98 and pad 100 of normal or conventional design upwardly through the registering openings 105 and 106 into position at the rear side of the tape, which is that side remote from the capstan and playing head, and the roller thereafter presses the tape against the capstan 22 while the pad 100 presses the tape against the playing elements 102 of normal design. These playing elements are electrically and electronically connected with suitable audio devices so as to translate the latent sound on the tape into audio.

The advantages of the above system are that, among others, all the linkages can be formed from stamped or punched pieces; no rewind mechanism is needed or required; a single knob controls the setting of the pressure roller and guide as well as locking the magazine into playing position; and the manual inserting of the magazine or cartridge lowers the tape into playing position.

It will be clear, it is believed, that after the playing is completed, the knob 52 is turned back to non-playing position, whereupon the platform is lowered and the tape is freed. In so doing the cartridge pin is removed and the cartridge or magazine may then easily be slid out and the tape therein is in exact position for playing again.

Having thus fully described our invention, what we claim as new and desire to secure by Letters Patent is:

1. In a tape recorder-reproducer having a playing head and a rotary capstan for driving a tape past the playing head, the combination with a tape magazine, of an apertured base, means mounting said head and capstan on said base, said base supporting the magazine in proximity to the capstan and head, a platform beneath said base, a pressure roller and pressure pad mounted on said platform, means supporting said platform on said base for upward movement to carry said roller and pad through the aperture in the base and to position the same at the rear of said tape and for forward movement to engage and press said tape against said capstan and head respectively, and devices operatively connected to said platform to effect such upward and forward movements of said platform in sequence, said devices including a bellcrank supported for pivotal and translational movement on said base, a pivotal connection between said bellcrank and said platform, and spring means resisting translational movement of said bellcrank prior to completion of pivotal movement thereof.

2. In a tape recorder-reproducer having player head means and a rotary capstan for driving a tape past the player head means, the combination with a tape magazine, said magazine comprising a housing having an opening in one end wall thereof and having therein tape guiding means for leading a tape past the said opening, a base, means mounting said head and capstan on said base, said base supporting the magazine with the opening thereof in proximity to the capstan and head, a platform, a pressure roller and pressure pad mounted on said platform, linkage members pivotally mounted on axes generally parallel to and supporting said platform on said base, resilient means resisting translatory movement of said linkage members in a generally horizontal plane, a control element, and means for pivotally connecting said control element to siad linkage members for effecting movement of said linkage members about their respective axes to effect vertically upward movement of said platform until said pressure roller and said pressure pad reach a predetermined vertical position and sequentially effecting horizontal movement of said pressure roller and said pressure pad against the action of the resilient means to engage and press said tape against said capstan and said head respectively.

References Cited in the file of this patent

UNITED STATES PATENTS

| | | |
|---|---|---|
| 2,525,926 | Matthews | Oct. 17, 1950 |
| 2,699,332 | MacKenzie | Jan. 11, 1955 |
| 2,778,636 | Eash | Jan. 22, 1957 |
| 2,778,880 | Eash | Jan. 22, 1957 |
| 2,876,005 | Eash | Mar. 3, 1959 |
| 2,898,409 | Tiger | Aug. 4, 1959 |
| 2,911,215 | Cousino | Nov. 3, 1959 |

FOREIGN PATENTS

| | | |
|---|---|---|
| 633,160 | Germany | July 21, 1936 |
| 1,138,699 | France | Jan. 28, 1957 |
| 793,519 | Great Britain | Apr. 16, 1958 |

OTHER REFERENCES

"Automatic Tape Player" (Magnetic Film and Tape Recording Magazine, April 1955, page 29).